W. H. HART, Jr.

HOLDER FOR NECKTIES.

No. 4,162. Reissued Oct. 25, 1870

Witnesses:

M. H. Wickel

J. C. Brown

Inventor:

Wm. H. Hart Jr by Wiedersheim & Norris

Attys.

THE NORRIS PETERS CO., PHOTO-LITHO., WASHINGTON, D. C.

United States Patent Office.

WILLIAM H. HART, JR., OF PHILADELPHIA, PENNSYLVANIA.

Letters Patent No. 76,186, dated March 31, 1868; reissue No. 4,162, dated October 25, 1870.

DIVISION A.

IMPROVEMENT IN HOLDERS FOR NECK-TIES.

The Schedule referred to in these Letters Patent and making part of the same.

*To all whom it may concern:*

Be it known that I, WILLIAM H. HART, Jr., of the city and county of Philadelphia and State of Pennsylvania, did invent a new and improved Holder for Neck-Ties; and I do hereby declare the following to be a clear and exact description of the nature thereof sufficient to enable others skilled in the art to which my invention appertains to fully understand and use the same, reference being had to the accompanying drawing making part of this specification, in which—

Similar letters of reference indicate corresponding parts in the two figures.

Figure 1:
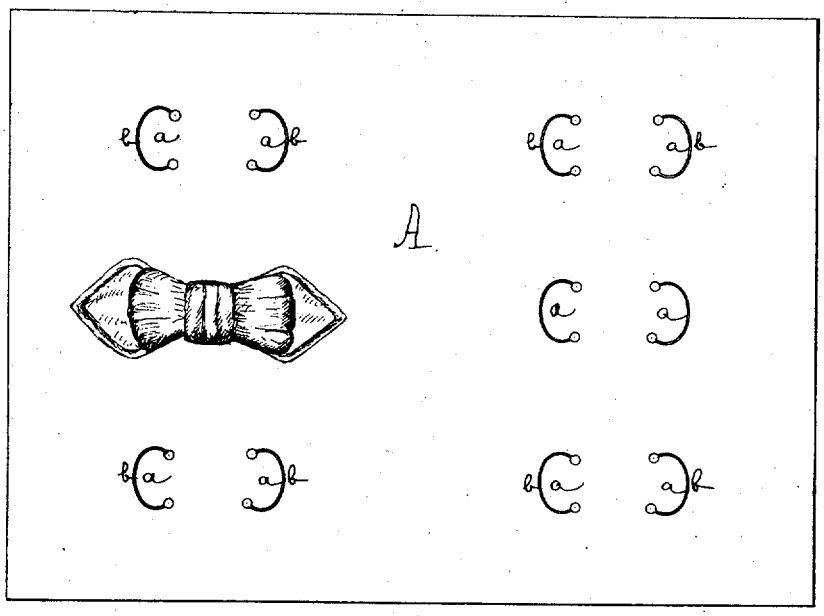
Figure 1 is a face view of the device, illustrating my invention.
Figure 2:
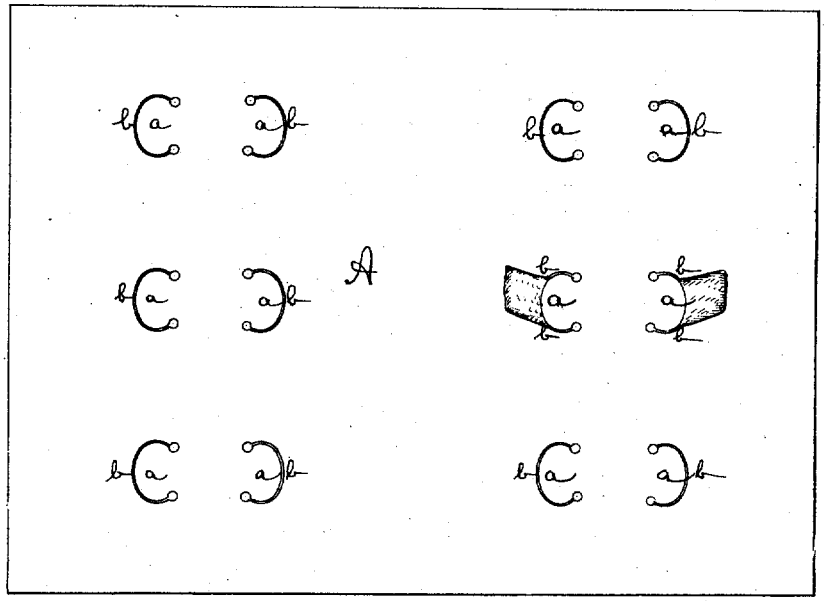
Figure 2 is a rear view thereof.

My invention consists in a card having cut therein one or more pairs or sets of yielding tongues, which face outwardly in opposite directions, and form means for readily retaining and exhibiting neck-ties or cravats.

A in the drawing represents a card or holder.

Tongues *a a* are formed in the holder by making incisions *b b* therein. The tongues are arranged in pairs or sets, and the side of one tongue faces in opposite direction to that of its mate. The tongues possess a certain amount of elasticity, and when the ends of the neck-tie-supporters are introduced into the openings between the tongues and the uncut portions of the card the tongues will bear or press the supporters against the holder A and retain them in place.

When the ends of the back or supporting-plates of the ties are introduced into the openings formed by the tongues, the ties are held in place, for all purposes sufficiently firm, but when handled for removal they are readily withdrawn without interference from and danger to the tongues.

When the ties are arranged and held on the holder, the tongues are in the rear, and an assortment of ties may thus be viewed or inspected, and, owing to the unexposed position of the tongues, they are in no danger of injury.

When a number of holders are packed the ties are firmly held thereon, and will not shift during transportation.

The tongues may be made of any suitable shape, care being taken not to cut the openings in straight lines.

I am aware that holders for exhibiting articles of various kinds have had mere incisions cut therein, and others with narrow, oblong, and oval openings, but in neither case are formed tongues which yield as the articles are inserted in place, and then press them against the uncut portions of the holder, in order to firmly hold them in place. Such incisions and openings I do not claim; but I do claim—

The holder for neck-ties or cravats, consisting of the card A, provided with one or more pairs of tongues, the outer side of one tongue facing in opposite direction to that of the other tongue, and operating substantially as and for the purpose described.

WM. H. HART, JR.

Witnesses:

WM. R. WRIGHT,

J. M. COLGAN.